W. H. BEACH & C. N. HANSON.
Earth-Augers.
No. 135,509. Patented Feb. 4, 1873.
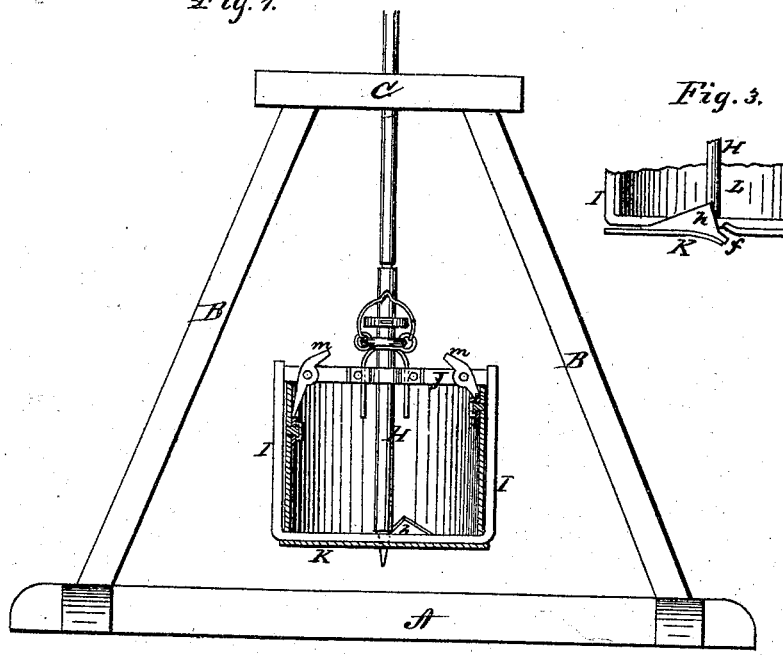
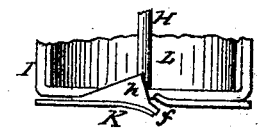
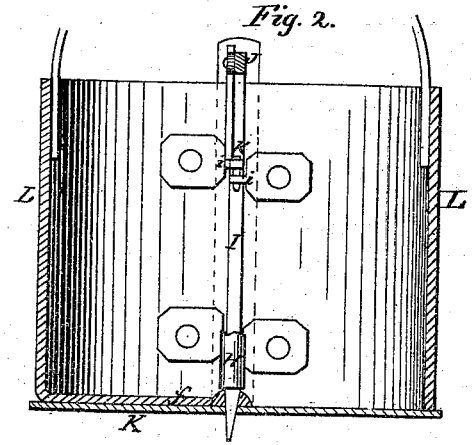

UNITED STATES PATENT OFFICE.

WILLIAM H. BEACH AND CHANCEY N. HANSON, OF HAMBURG, IOWA, ASSIGNORS TO THEMSELVES, H. F. WHITE, AND W. W. SMITH, OF SAME PLACE.

IMPROVEMENT IN EARTH-AUGERS.

Specification forming part of Letters Patent No. 135,509, dated February 4, 1873.

*To all whom it may concern:*

Be it known that we, WILLIAM H. BEACH and CHANCEY N. HANSON, of Hamburg, in the county of Fremont and in the State of Iowa, have invented certain new and useful Improvements in Well-Augers; and do hereby declare that the following is a full, clear, and exact description thereof, reference being had to the accompanying drawing and to the letters of reference marked thereon.

The nature of our invention consists in the construction and arrangement of an auger for boring wells, as will be hereinafter more fully set forth.

In order to enable others skilled in the art to which our invention appertains to make and use the same, we will now proceed to describe its construction and operation, referring to the annexed drawing which forms a part of this specification, and in which—

Figure 1 is a vertical section of our well-auger. Fig. 2 is a similar section of the auger in enlarged dimensions; and Fig. 3 is a side view of the lower part of the same in reduced dimensions.

I represents a metal bar bent so as to form the bottom and sides of a frame of which a bar, J, is the top, this latter bar being secured to the ends of the bar I. Through the center of this frame, and firmly secured to it, passes the shaft H, the lower end of which is pointed and projects below the frame, as shown. To the bottom bar of this frame is attached the bottom K of the bucket, which bottom is made in two pieces cut out in suitable manner and provided with cutting lips or plates $ff$, the outer sides of which are turned up, forming the side cutters $h\ h$. L L represent two halves of a cylinder, which completes the dirt-bucket.

On the edges of these half-cylinders are eyes or loops $i\ i$, which fasten on hooks $k\ k$ attached to the side pieces of the frame I J. The half-cylinders L L are held in their places by angular levers $m\ m$ pivoted on the bar J and turned so as to be over the loops $i\ i$, thereby preventing them from coming off of the hooks $k\ k$.

The bucket thus constructed with its central shaft is attached or connected to any suitable auger-shaft placed in a convenient frame or support, A B C, and operated by any of the known and usual means, and in any suitable manner. As the auger works down into the ground the earth passes up into the bucket, and when the same is filled, it is detached from the auger-shaft, raised up out of the well and taken or conveyed to the place where it is to be emptied. The levers $m\ m$ on the bar J are turned to one side so that one of the half-cylinders L may be lifted off from the hooks $k\ k$, and thus empty the dirt.

Having thus fully described our invention, what we claim as new, and desire to secure by Letters Patent, is—

The combination of the frame I J, bottom K, with cutters $ff$ having side cutters $h\ h$, the half-cylinders L L with eyes $i\ i$, the hooks $k\ k$, and angular levers $m\ m$, all constructed and arranged substantially as and for the purposes herein set forth.

In testimony that we claim the foregoing, we have hereunto set our hands this 27th day of January, 1872.

WILLIAM H. BEACH.
CHANCEY N. HANSON.

Witnesses:
J. W. DALBEY,
J. W. HUBBARD.